United States Patent [19]

Clair

[11] Patent Number: 5,366,623

[45] Date of Patent: Nov. 22, 1994

[54] APPARATUS FOR MAGNETICALLY TREATING A FLUID

[76] Inventor: Colonel Clair, P.O. Box 94321, Las Vegas, Nev. 89199

[21] Appl. No.: 943,899

[22] Filed: Sep. 11, 1992

[51] Int. Cl.$^5$ .................................................. C02F 1/48
[52] U.S. Cl. .................................. 210/222; 166/66.5; 166/902; 335/304; 96/1
[58] Field of Search ............... 210/222; 166/66.5, 902; 335/297, 302, 304, 306; 209/224, 232; 96/1

[56] References Cited

U.S. PATENT DOCUMENTS

| | | | |
|---|---|---|---|
| 2,652,925 | 9/1953 | Vermeiren | 210/1.5 |
| 4,210,535 | 7/1980 | Risk | 210/222 |
| 4,265,746 | 5/1981 | Zimmerman, Sr. et al. | 210/695 |
| 4,265,754 | 5/1981 | Menold | 210/222 |
| 4,265,755 | 5/1981 | Zimmerman | 210/222 |
| 4,498,987 | 2/1985 | Inaba | 210/222 |
| 5,052,491 | 10/1991 | Harms et al. | 166/66.5 |
| 5,186,827 | 2/1993 | Liberti et al. | 210/222 |

FOREIGN PATENT DOCUMENTS

| | | | |
|---|---|---|---|
| 174152 | 1/1966 | U.S.S.R. | 166/66.5 |
| WO81/02529 | 9/1981 | WIPO | B01D 35/06 |

Primary Examiner—Matthew O. Savage
Attorney, Agent, or Firm—David Pressman

[57] ABSTRACT

A magnetic well tubing and pipe protector/fluid ionizer for protecting the interior of pipes from scaling, corrosion, and algae, comprising a case (14) containing four magnetic condensers comprised of rectangular neodymium iron boron magnets (10 ...) and tapered concentrators (11 ...) which drive magnetic flux through a core (13) into flowing oil, water, or other fluids, ionizing and charging the fluid positive and the core (13) and all connected pumps and tubing negative. The flowing oil or water or other fluid cutting the perpendicular lines of magnetic flux (16) generates an electrical current which charges the pump and tubing or pipe negative enough to repel and prevent scaling, corrosion, and algaes. Also, the electrical current ionizes the oil, water or other fluids, improving separation of crude oil from water and contaminants. improving combustion of petroleum fuels, and increasing the heat transfer coefficient of heating and cooling water.

17 Claims, 2 Drawing Sheets

APPARATUS FOR MAGNETICALLY TREATING A FLUID

BACKGROUND

1. Field of Invention

This invention relates generally to devices for protecting pipes and ionizing fluids, specifically to an improved magnetic oil and water well tubing protection and fluid ionizing device.

2. Prior Art

Oil well pumps and the steel pipe or tubing which carries crude oil to the surface are normally susceptible to scaling, corrosion, and algaes, because of the large amount of high-mineral-content water that normally accompanies the crude oil. As a result, the pumps and tubing become restricted and weakened so that they pump and carry less oil, leak, and even burst. Also, many crude oil deposits are high in paraffin, causing heavy "paraffining" of the pumps and well tubing, which restricts the pumps and tubing, eventually stopping the flow of crude oil from the well.

The major cause of these problems is known as "pipe charging": Fluids running in pipes create a static interface with the inside pipe wall, charging it positive (Helmholtz, 1879; Gouy-Chapman, 1910-1913.)

The primary mineral in hard water is calcium carbonate, which dissolves into the water from limestone deposits in the earth. Calcium carbonate forms a rock-like calcite deposit in oil well and water pumps and oil tubing and all water pipes, and is commonly known as "pipe scale," or "scale." Scale gradually blocks and eventually stops oil and water pumps and well tubing and water pipes. Also, water itself causes problems. The water molecule is dipolar, with the hydrogen side positive and the oxygen side negative. The oxygen in water causes rust or corrosion in oil well and water pumps, well tubing, and water pipes, eventually weakening them until they leak or burst.

Paraffin is a wax that is common in most crude oils. Paraffin forms hard waxy layers inside oil well pumps and tubing. This growing restriction slows and eventually stops the pump and the flow of oil, in the tubing. Algaes that grow in water and oils stick on metal surfaces, grow slime and restrict flow, while digesting the iron and sulphates in the metals, causing "microbiological corrosion."

Toxic chemicals, solvents, and hot oil are normally used to combat these problems in oil wells. Such toxic chemicals, usually acids and expensive biocides, are generally added to water systems to prevent or dissolve these damaging deposits. While these chemicals and processes are marginally successful, they are very expensive and they are harmful to humans and the environment.

Magnetic devices have been used for preventing scaling, corrosion, and algae growth in pipes. U.S. Pat. No. 2,652,925 to Vermeiren (1949), U.S. Pat. No. 4,210,535 to Risk (1980), U.S. Pat. No. 4,265,746 to Zimmerman, Sr. et al. (1981), U.S. Pat. No. 4,265,754 to Menold (1981), and U.S. Pat. No. 4,265,755 to Zimmerman (1981), and International Application PCT/US81/00304 to White Light Industries (1981) show magnetic devices which fit around water pipes. These comprise a plurality of magnets with opposite poles spaced axially along the pipes. These magnets can project magnetic fields into nonferrous pipes only. The flux lines are generally parallel to the direction of water flow. According to the Faraday effect, a conductor—which in this case is the water—cuts magnetic flux lines and generates an electrical current in the conductor. However, because no current can be generated by a conductor that moves parallel to the flux lines, these devices did not generate any current. Also, these devices did not project magnetic flux lines through steel pipe walls, nor could they be fitted between well tubing and casing under a pump and sent to the bottom of a well. These factors rendered them ineffective and impractical for charging any commonly used pipe walls and well tubing negative. Since all of the damaging materials, in oil and water wells—carbonates, oxygen, algaes, and paraffin—are negative, a sufficient negative charge on the oil and water well pumps, valves, tubing and pipes, will protect them.

OBJECTS AND ADVANTAGES

Accordingly, several objects and advantages of the invention are to provide a magnetic pipe protector which produces a magnetic field with flux lines entirely perpendicular to the direction of fluid flow, which charges pipes negative, which causes pipes to repel all negative ions, such as carbonates, oxygen, and algaes, to protect pipes from deposits, corrosion, paraffining, and algae growth, respectively, which is easily installed below oil well or water well pumps, which is easily installed into oil or water well tubing joints, anywhere between the submerged pump and the surface of the well, without interfering with oil or water flow or oil well sucker rod action, which is easily introduced to oil wells with standard 2" tubing and a standard 4" well casing, which protects steel and nonferrous pipes, which is easy to install and adjust, which is compact, and which is simple and economical to manufacture.

Further objects and advantages will become apparent from a study of the following description and the accompanying drawings.

DRAWING FIGURES

Figure 1:
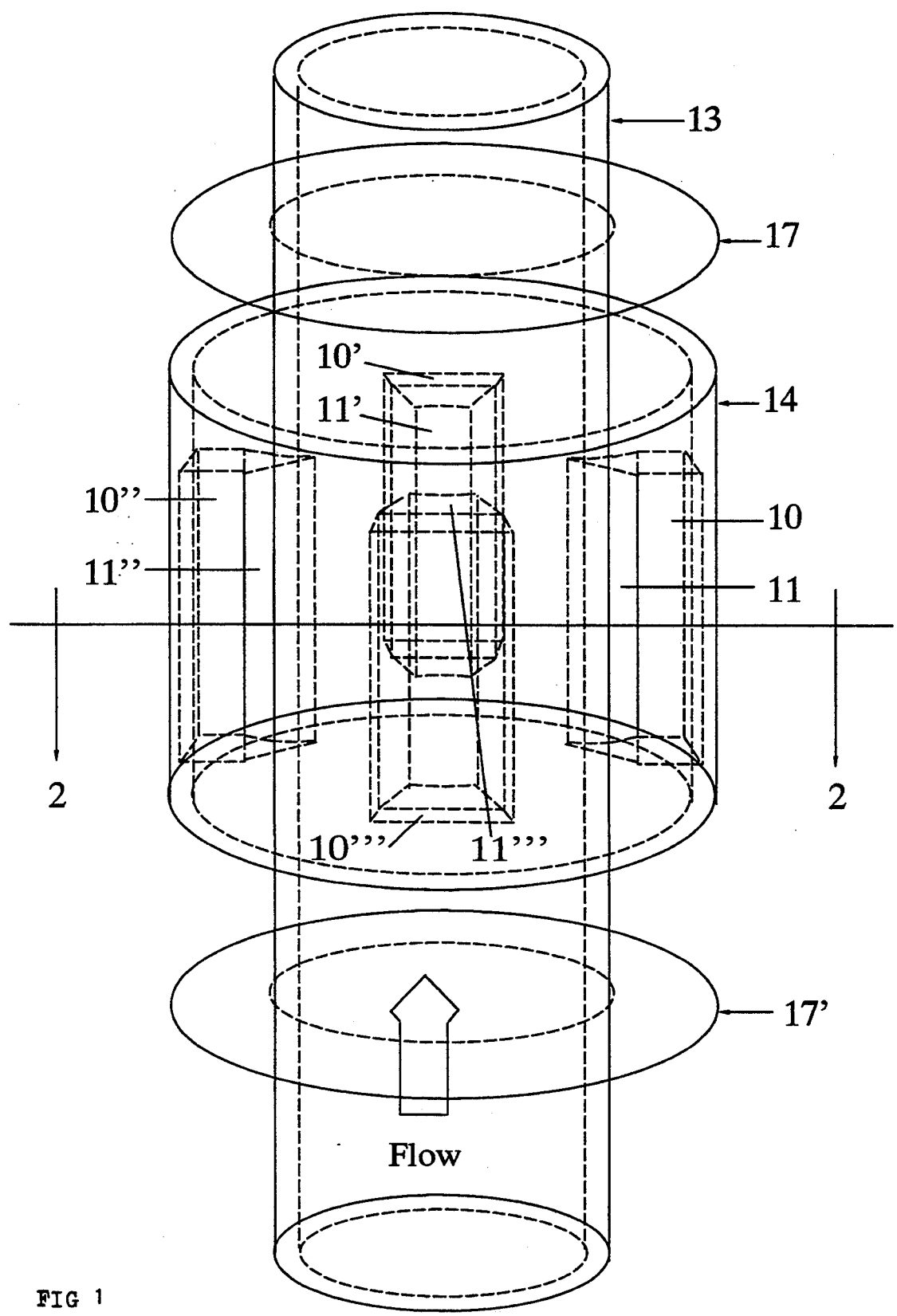
FIG. 1 is a perspective view of a magnetic well tubing protector, fitted below an oil well or water well pump in accordance with a preferred embodiment of the invention.

| Drawing Reference Numerals | | | |
|---|---|---|---|
| 10. Magnet | 10'. Magnet | 10". Magnet | 10'''. Magnet |
| 11. Concentrator | 11'. Concentrator | 11". Concentrator | 11'''. Concentrator |
| 12. Strut | 12'. Strut | 12". Strut | 12'''. Strut |
| 13. Core | 14. Case | 15. Sucker Rod | 16. Flux Lines |
| 17. Top Cap | 17'. Bottom Cap | 18. Groove | 18'. Groove |
| 18". Groove | 18'''. Groove | 19. Groove | 19'. Groove |
| 19". Groove | 19'''. Groove | 20. Groove | 20'. Groove |

| | |
|---|---|
| 20". Groove | 20"'. Groove |

DESCRIPTION—FIG. 1

Figure 2:
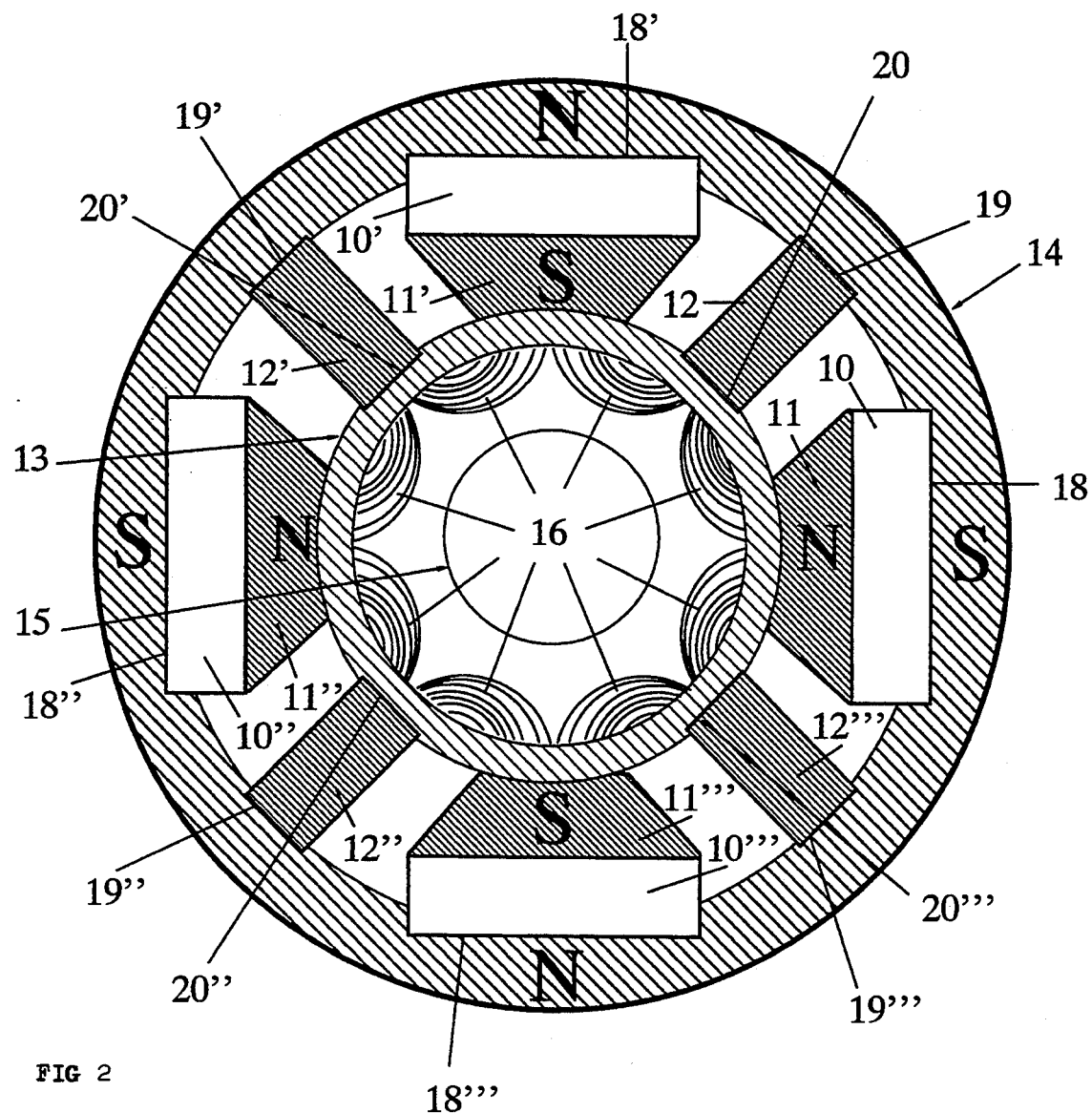
FIG. 2 is a cross sectional view of the well tubing protector of FIG. 1, but also showing struts and an oil pump sucker rod, fitted into the well tubing string, between the pump and the surface.

In accordance with a preferred embodiment of the invention shown in FIG. 1, a magnetic well tubing protector comprises a case 14 of 3" schedule #80 API steel (ferrous) tubing containing four magnetic condensers attached to the inside of case 14 and the outside of core 13. Core 13 is a standard 10" nipple of 2" schedule #80 API steel tubing, threaded on both ends. These magnetic condensers are made up of magnets 10, 10', 10", and 10"' and steel concentrators 11, 11', 11", and 11"' and have alternate polarities as shown in FIG. 2: Concentrators 11 and 11" have north polarities and concentrators 11' and 11" have south polarities. These magnets are flat, rectangular (1"×2"×0.250") neodymium iron boron (Nd—Fe—B,) having an extremely high flux density of 12,000 gauss. The outside surfaces of these magnets are embedded not more than ¼ of their thicknesses in 1"×2" machined flat grooves, 18, 18', 18", and 18"'. These grooves are cut equidistant from each other in the inside surface of case 14, with their 2" dimensions lengthwise (vertical), 5" from the top and 0.5" from the bottom of case 14. Each of the plurality of magnets has a strength sufficient to create enough flux in its respective pole piece concentrator such that the concentrator carries sufficient flux to the ferrous cylindrical wall to create surplus magnetic flux in the wall in excess of the magnetic flux carrying capacity of the wall so that the surplus flux will extend within the interior of the core, perpendicular to the axis of the core and the direction of fluid flow in the interior of the core.

Attached to the inside surface of the magnets are magnetically saturated steel pole piece concentrators 11, 11', 11", 11"', the proximal ends of which are the same widths as the magnets. A sharp taper (45 degrees) narrows concentrators 11, 11', 11", 11"' to half their initial width at their distal (internal) ends to increase their flux densities. The distal ends of concentrators 11, 11', 11", 11"' have concave surfaces, with each surface radiused to the outside of core 13 to maximize surface contact with it. The four struts 12, 12', 12", 12"' (not shown in FIG. 1) are solid steel rectangular (1"×2"×0.250") bars with their outside edges imbedded into machined flat grooves 19, 19', 19", 19"' which are 0.250" wide×2" long×0.083" deep, cut lengthwise in case 14. The struts also have their inside edges imbedded into machined flat grooves 20, 20', 20", 20"' which are 0.250" wide×2" long×0.083" deep, cut lengthwise (vertical) in core 13, 0.5" from the top and 0.5" from the bottom of case 14.

Core 13 is 2" steel (ferrous) API schedule #80 well tubing, 10" long, threaded on each end and ni-cad or nickel plated. Case 14 is 3" steel API schedule #80 well tubing, 3" long and ni-cad or nickel plated. Top cap 17 and bottom cap 17', shown schematically in FIG. 1, are ni-cad or nickel plated 16 ga steel plates that seal the ends of case 14. Pole piece concentrators, 11, 11", 11, 11"' are 1018 grade steel.

All parts are held together magnetically. The entire magnetic assembly is potted with an adhesive polymer (not shown) which fills case 14, protecting all internal parts from corrosion. Also the potting seals top cap 17 and bottom cap 17' to case 14. The direction of oil or water flow is indicated by the arrow.

The magnetic well tubing protector is easily installed in an oil or water well by being screwed into the bottom of the pump or onto a standard threaded coupling beneath the pump, when the well is serviced or repaired and the well tubing and pump (which is at the bottom of the string of tubing) is pulled to the surface. The device is also easily inserted in the well tubing string, anywhere, between the pump and the surface for added protection in very deep (over 3,000 feet) wells. The device may also be used to protect surface pipelines and is also easily inserted into any surface length of standard 2" pipe or tubing by means of standard flanges or threaded couplings.

DESCRIPTION—FIG. 2

Here, in a cross sectional view, the well tubing protector of FIG. 1 is installed in the well tubing between the pump and the surface. A pump sucker rod 15, which operates the pump at the bottom of the well, easily clears the standard 2" API tubing of core 13, without restricting fluid flow and with the same volume of oil or water being pumped through the well tubing protector as is pumped through the rest of the well tubing, between the pump and the surface. Here, struts 12, 12', 12", 12"', clearly shown imbedded in grooves 19, 19', 19", 19"' in case 14 and grooves 20, 20', 20", 20"' in core 13, brace core 13 inside case 14 and provide close flux paths 16 from concentrators 11, 11', 11", and 11"' to each pair of adjoining struts, respectively, such as from concentrator 11 to adjoining struts 12 and 12"'.

OPERATION—FIGS. 1 TO 2

In the preferred embodiment of the well tubing protector shown in FIGS. 1 and 2, each magnet, such as magnet and concentrator assembly 10 and concentrator 11, form a "bar magnet" dividing its field between struts 12 and 12"'. The magnetic circuit is completed from the north pole of magnet 10, through concentrator 11, through struts 12 and 12", through the wall of case 14 where groove 18 contacts the south pole of magnet 10. Because of the strength of magnet 10 and the taper of its pole piece concentrator 11, the tapered inner end of concentrator 11 will be magnetically saturated. As shown in FIG. 2, the inner end of concentrator 11 has a larger cross-sectional area than the portion of the wall of core 13 which connects such inner end to strut 12. Because of this and the closeness of strut 12, there will be surplus flux for this portion of such wall. This surplus flux will travel in an arc away from the wall within the interior of core 13, as shown by lines 16. I.e., such surplus flux will follow curved path 16 through any fluid in the interior of core 13, perpendicular to the core's axis, and thus perpendicular to the flow of any such fluid. A similar field occurs with the other concentrators.

Because all lengths of magnetic flux lines, as shown in example flux 16, are completely perpendicular to all oil or water flow as indicated in FIG. 1, they are always cut by the moving oil or water at the maximum, thus producing the most efficient angle to generate the maximum electrical current possible. Therefore, a relatively strong electrical current flows between the oil or water and core 13. This charges core 13 and the connected pump and/or pipe string, sufficiently negative to repel scale, corrosion, and algaes.

BENEFITS

Negatively charged core 13 and the connected pump and pipe string repel all negative ions in the flowing oil and water, such as carbonates and oxygen. Furthermore, negatively charged core 13 and the connected pump and pipe string repel algaes which need a positive surface on which to attach. As a result, the well pump and entire tubing string to the surface is kept clean to maintain its flow capacity and structural strength. If the pump and well tubing are already encrusted with scale, corrosion, and algae, the well tubing protector can rid the pump and well tubing of these harmful deposits.

The negatively charged pump and well tubing causes the positive hydrogen ions, in oil, and in water, to combine with the calcite (scale) deposits to dissolve the deposits into calcium bicarbonate and water which are carried away by the oil and water stream. Therefore, scaling is removed and further deposits are prevented.

The negatively charged pump and well tubing also causes the positive hydrogen ions in oil and water to dissolve the iron oxide rust, or corrosion into the water as Iron and water which are carried away by the oil and water stream.

Furthermore, the positively charged oil and water and the negatively charged pump and well tubing interfere with algae cell division, which prevents any attached algaes from maintaining their slime layer and from continuing their growth. Therefore any attached algaes quickly die and are carried away by the oil and water stream, while further algae attachment or growth is repelled and prevented by the negative pump and well tubing.

Also, in oil wells with paraffin content, the negative pump and well tubing repel the paraffin, preventing paraffining.

SUMMARY, RAMIFICATIONS AND SCOPE

Accordingly the reader will see that I have provided an improved magnetic well tubing protector for protecting all well pumps and tubing carrying oil, water, and natural gas, as well as a pump, pipe or tubing protector for any fluid carrying pipes, including, but not limited to, cooling, heating, culinary, laundry, irrigation, swimming pool, fountain, potable water, gasoline, diesel, and fuel oil pipes. It may be used to project multiple magnetic fields into the stream of fluid within a pipe, such that the fluid cuts through all the flux lines perpendicularly for most efficiently charging the pipe negative. It may be used to prevent scale, corrosion, paraffining, and algae growth in fluid carrying pipes. It may be used to dissolve and remove calcite scaling, rust, corrosion, and algae in damaged pipes, to clear the pipes, and to prevent further damage. It may be used to provide more effective and economical cathodic protection for cross-country water, natural gas, and petroleum pipelines. It eliminates the recurring cost and need for conventional well and pipe treatments with expensive toxic chemicals. It uses only four magnets which achieve a very high efficiency. It is highly compact and easy to install and adjust and any number of units may by installed in deep wells on onto long pipelines, for complete protection and increased effectiveness. It may be used to protect non-ferrous pipes. Furthermore, it is simple and economical to manufacture.

While the above descriptions are specific, they should not be considered as limitations on the scope of the invention, but only as examples of the preferred embodiment. Many other ramifications and variations are possible within the teachings of the invention. For example, a different type of permanent magnet, or an electromagnet, may be used. The parts may be shaped differently. The distal ends of concentrators 11, 11', 11'', 11''' which contact core 13 may be reduced to long and narrow edges, or may have the radii of their surfaces adjusted to conform precisely to different pipe sizes. Also the relational sizes of the magnets, concentrators, and struts to each other may be changed to alter the magnetic flux paths. Also fewer or more than four magnets may be used.

Thus the reader is requested to determine the scope of the invention by the appended claims and their legal equivalents, and not by the examples given.

I claim:
1. A device for treating fluid, comprising:
a surrounding ferrous cylindrical case having an enclosing configuration and a hollow interior, said case having an outside surface, an inside surface, and a central axis,
a plurality of magnets attached to said inside surface of said case at spaced circumferential locations around said inside surface, said magnets being charged so that their poles are radially aligned, said magnets alternating in polarity so that each adjacent pair of magnets have two inside pole surfaces of respectively opposite polarities facing said central axis, and two outside pole surfaces of respectively opposite polarities attached to said inside surface of said case, the inside surface of said cylindrical case having a corresponding plurality of recesses, said outside pole surfaces of said plurality of magnets being positioned in said recesses,
a corresponding plurality of pole piece concentrators attached to said inside pole surfaces of said magnets, respectively, each pole piece concentrator having two radially opposite ends, one radially opposite end being an inside end and the other radially opposite end being an outside end, each pole piece tapering radially inwardly from a relatively large cross-sectional area at its outside end adjacent said inside pole surface of its respective magnet to a relatively small cross-sectional area at its opposite and inside end,
a ferrous well tube comprising a hollow core which has a ferrous cylindrical wall which is coaxial with and concentrically inside said surrounding ferrous cylindrical case, said magnets, and said pole pieces,
said core having a central axis which coincides with said axis of said surrounding ferrous cylindrical case,
said ferrous cylindrical wall having an outside surface, an inside surface, and a central axis, said outside surface being a convex, curved, outside cylindrical surface, said outside surface being contiguous said inside ends of said pole pieces,
said inside end of each of said pole pieces being a concave, curved, inside cylindrical surface which is shaped and sized to conformingly mate with said outside surface of said ferrous cylindrical wall,
each of said magnets having a radially outside surface which is in contact with said surrounding ferrous cylindrical case and a radially inside surface which is in contact with the radially outside end of its respective pole piece, said inside end of each pole piece being in contact with said outside surface of said ferrous cylindrical wall so that a continuous, gapless magnetic path exists between the poles of each of said magnets, each of said plurality of magnets being of sufficient strength to create enough flux in its respective pole piece concentrator that said concentrator carries sufficient flux to said ferrous cylindrical wall to create surplus magnetic flux in said wall in excess of the magnetic flux carrying capacity of said wall so that said surplus flux will extend within the interior of said core, perpendicular to said axis of said core and the direction of fluid flow in said interior of said core, whereby said fluid ionizer and protector can be attached to a well pump or in well tubing so that pumped fluid will flow through said ferrous cylindrical core and cut said protector's perpendicular magnetic lines of force, thereby generating electrical currents and charges that will charge said well pump and tubing negative, thereby protecting said well pump and tubing from scale, corrosion, paraffining, and algae buildup.

2. The device of claim 1 wherein said magnets each have a flux density of about 12,000 gauss.

3. The device of claim 1 wherein said magnets are made of neodymium iron boron.

4. The device of claim 1 wherein said case and said core each have a circular cross section.

5. The device of claim 4 wherein said pole piece concentrators each have a generally trapezoidal configuration with a major base surface constituting said outside end and a minor top surface constituting said inside end, said inside end having a concave circular curvature conforming to said outside surface of said cylindrical core.

6. The device of claim 1 wherein said magnets are four in number and said pole piece concentrators are also four in number.

7. The device of claim 1 wherein said magnets each have a rectangular configuration with two major planar faces constituting said inside and outside pole surfaces.

8. The device of claim 1 wherein said magnets each have a rectangular configuration with two major planar faces constituting said inside and outside pole surfaces and wherein said pole piece concentrators each have a generally trapezoidal configuration with a major base surface constituting said outside end and a minor inside surface constituting said inside end, said inside end having a concave curvature conforming to said outside surface of said wall of said cylindrical core.

9. The device of claim 4 wherein said magnets each have a flux density of about 12,000 gauss and wherein said magnets are made of neodymium iron boron.

10. The device of claim 1, further including a corresponding plurality of ferrous struts, each strut extending radially between and contiguous to said surrounding ferrous cylindrical case and said ferrous cylindrical wall, each strut being positioned between an adjacent pair of magnets and their respective pole piece concentrators.

11. The device of claim 10 wherein a radially outer end of each of said struts is embedded in a recess in said surrounding ferrous cylindrical case.

12. A device for treating fluid, comprising:

a surrounding ferrous cylindrical and circular case having an enclosing configuration and a hollow interior, said case having an outside surface, an inside surface, and a central axis, a plurality of magnets attached to said inside surface of said case at spaced circumferential locations around said inside surface, said magnets being charged so that their poles are radially aligned, said magnets alternating in polarity so that each adjacent pair of magnets have two inside pole surfaces of respectively opposite polarities facing said central axis, and two outside pole surfaces of respectively opposite polarities attached to said inside surface of said case, a corresponding plurality of pole piece concentrators attached to said inside pole surfaces of said magnets, respectively, each pole piece concentrator having a trapezoidal configuration and two radially opposite ends, one radially opposite end being an inside end and the other radially opposite end being an outside end, each pole piece tapering radially inwardly from a relatively large cross-sectional area at its outside end adjacent said inside pole surface of its respective magnet to a relatively small cross-sectional area at its opposite and inside end, a ferrous well tube comprising a hollow ferrous cylindrical and circular core which is coaxial with and concentrically inside said surrounding ferrous cylindrical case, said magnets, and said pole pieces, said inside surface of said cylindrical case having a corresponding plurality of recesses, said outside pole surfaces of said plurality of magnets being positioned in said recess, and wherein said case and said core each have a circular cross section, said ferrous cylindrical core having a central axis which coincides with said axis of said surrounding ferrous cylindrical case, said ferrous cylindrical core comprising a surrounding wall having an outside surface, an inside surface, and a central axis, said outside surface being a convex, curved, outside cylindrical surface, said outside surface being contiguous said inside ends of said pole pieces, said inside end of said pole pieces being a concave, curved, inside cylindrical and circular surface which is shaped and sized to conformingly mate with said outside surface of said surrounding wall, each of said plurality of magnets having a radially outside surface which is in contact with said surrounding ferrous cylindrical case and a radially inside surface which is in contact with the radially outside end of its respective pole piece, said inside end of each pole piece being in contact with said outside surface of said ferrous cylindrical wall so that a continuous, gapless magnetic path exists between the poles of each of said magnets, each of said plurality of magnets being of sufficient strength to create enough flux in its respective pole piece concentrator that said concentrator carries sufficient flux to said ferrous cylindrical wall to create surplus magnetic flux in said wall of said core in excess of the magnetic flux carrying capacity of said wall so that said surplus flux will extend within the interior of said core perpendicular to said axis of said core and the direction of fluid flow in said interior of said core, whereby said fluid ionizer and protector can be attached to a well pump or in well tubing so that pumped fluid will flow through said ferrous cylindrical core and cut said protector's perpendicular magnetic lines of force, thereby generating electrical currents and charges that will charge said well pump and tubing negative, thereby protecting said well pump and tubing from scale, corrosion, paraffining, and algae buildup, 13. The device of claim 12 wherein said magnets each have a flux density of about 12,000 gauss and are made of neodymium iron boron.

14. The device of claim 12 wherein said inside end of each of said pole piece concentrators has a concave curvature conforming to said outside surface of said cylindrical core and wherein said magnets each have a flux density of about 12,000 gauss and said magnets are made of neodymium iron boron.

15. The device of claim 12, further including a corresponding plurality of ferrous struts, each strut extending radially between and contiguous to said surrounding ferrous cylindrical case and said ferrous well tube, each strut being positioned between an adjacent pair of magnets and their respective pole piece concentrators.

16. The device of claim 15 wherein a radially outer end of each of said struts is embedded in a recess in said surrounding ferrous cylindrical case.

17. A device for treating fluid, comprising:
- a surrounding ferrous cylindrical case having an enclosing configuration and a hollow interior, said case having an outside surface, an inside surface, and a central axis,
- a plurality of magnets attached to said inside surface of said case at spaced circumferential locations around said inside surface, said magnets being charged so that their poles are radially aligned, said magnets alternating in polarity so that each adjacent pair of magnets have two inside pole surfaces of respectively opposite polarities facing said central axis, and two outside pole surfaces of respectively opposite polarities attached to said inside surface of said case,
- a corresponding plurality of pole piece concentrators attached to said inside pole surfaces of said magnets, respectively, each pole piece concentrator having two radially opposite ends, one radially opposite end being an inside end and the other radially opposite end being an outside end, each pole piece tapering radially inwardly from a relatively large cross-sectional area at its outside end adjacent said inside pole surface of its respective magnet to a relatively small cross-sectional area at its opposite and inside end,
- a ferrous well tube comprising a hollow ferrous cylindrical core which is coaxial with and concentrically inside said surrounding ferrous cylindrical case, said magnets, and said pole pieces,
- said ferrous cylindrical core having a central axis which coincides with said axis of said surrounding ferrous cylindrical case,
- said ferrous cylindrical core comprising a surrounding wall having an outside surface, an inside surface, and a central axis, said outside surface being a convex, curved, outside cylindrical surface, said outside surface being contiguous said inside ends of said pole pieces,
- said inside end of said pole pieces being a concave, curved, inside cylindrical surface which is shaped and sized to conformingly mate with said outside surface of said ferrous cylindrical core,
- each of said plurality of magnets having a radially outside surface which is in contact with said surrounding ferrous cylindrical case and a radially inside surface which is in contact with the radially outside end of its respective pole piece, said inside end of each pole piece being in contact with said outside surface of said ferrous cylindrical core so that a continuous, gapless magnetic path exists between the poles of each of said magnets,
- each of said plurality of magnets being of sufficient strength to create enough flux in its respective pole piece concentrator that said concentrator carries sufficient flux to said ferrous cylindrical wall to create surplus magnetic flux in said wall in excess of the magnetic flux carrying capacity of said wall of said core so that said surplus flux will penetrate to and extend within the interior of said core perpendicular to said axis of said core and the direction of fluid flow in said interior of said core,
- a corresponding plurality of ferrous struts, each strut extending radially between and contiguous to said surrounding ferrous cylindrical case and said wall of said ferrous well tube, each strut being positioned between an adjacent pair of magnets and their respective pole piece concentrators,
- whereby said fluid ionizer and protector can be attached to a well pump or in well tubing so that pumped fluid will flow through said ferrous cylindrical core and cut said protector's perpendicular magnetic lines of force, thereby generating electrical currents and charges that will charge said well pump and tubing negative, thereby protecting said well pump and tubing from scale, corrosion, paraffining, and algae buildup.

* * * * *